May 12, 1970  R. S. PETERSEN  3,511,101
GAS DRIVEN GYROSCOPE SPEED CONTROL

Filed Aug. 19, 1966  3 Sheets-Sheet 1

INVENTOR.
RUDOLPH S. PETERSEN
BY
ATTORNEY

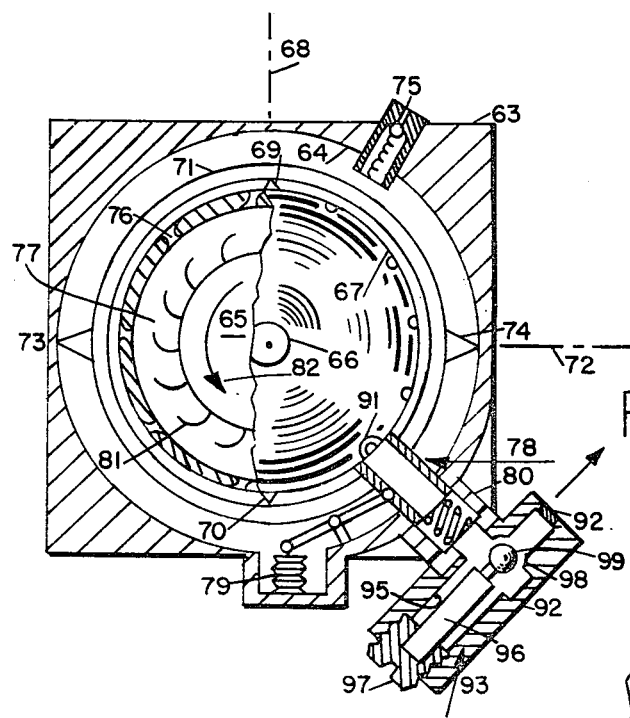
FIG. 8.
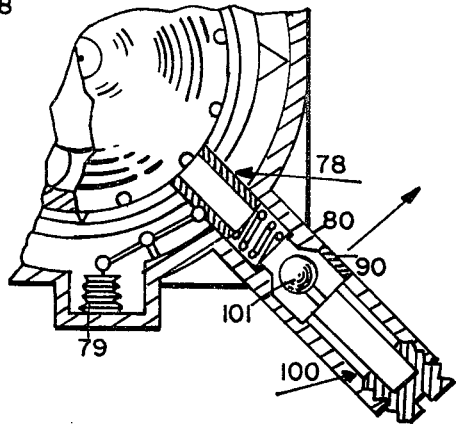
FIG. 9.
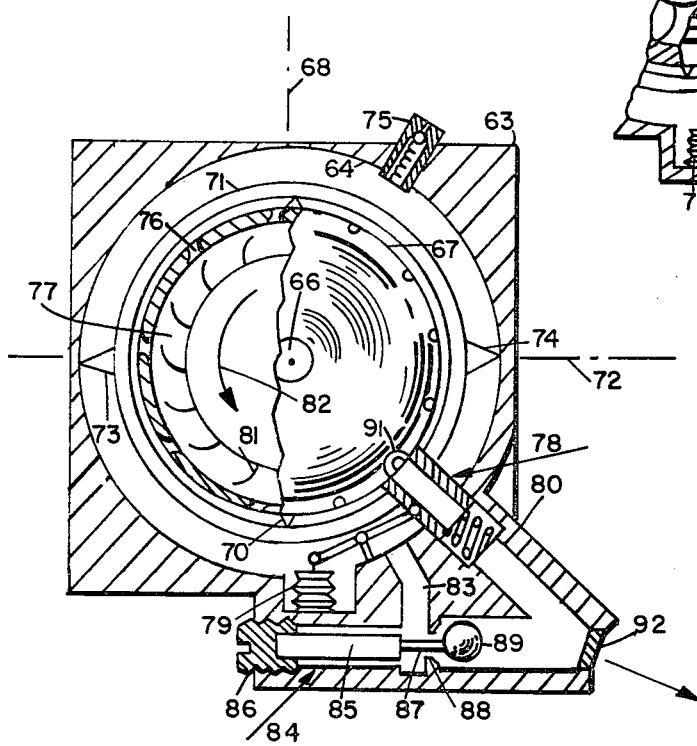
FIG. 7.
INVENTOR.
RUDOLPH S. PETERSEN

May 12, 1970            R. S. PETERSEN            3,511,101
GAS DRIVEN GYROSCOPE SPEED CONTROL
Filed Aug. 19, 1966            3 Sheets-Sheet 3
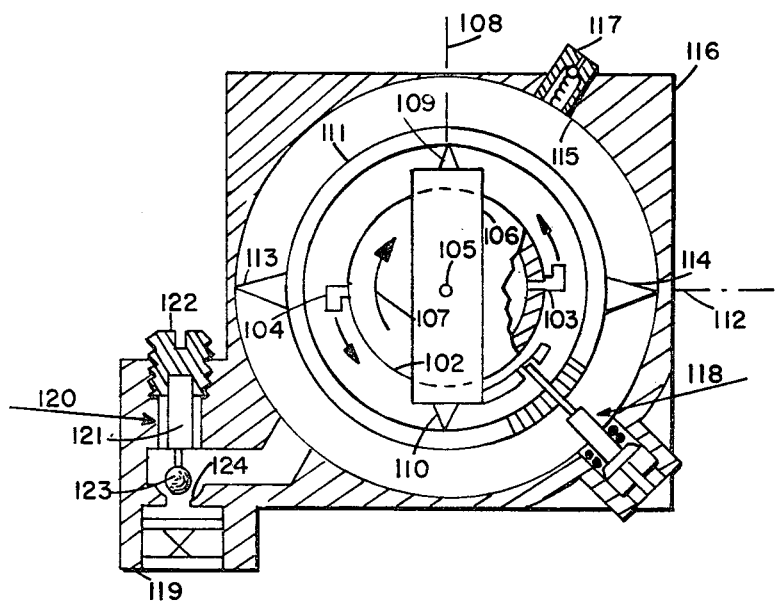
FIG.10.
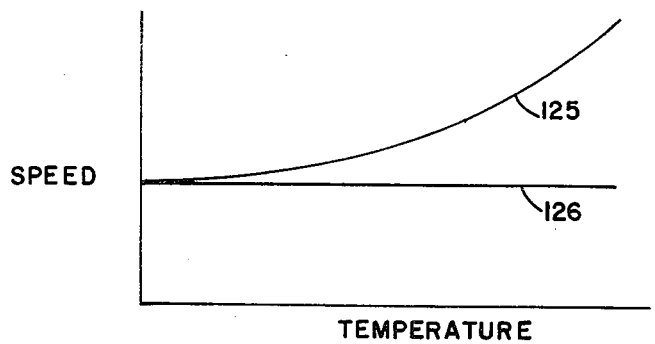
FIG.11.
INVENTOR.
RUDOLPH S. PETERSEN
BY
ATTORNEY United States Patent Office 3,511,101
Patented May 12, 1970

3,511,101
GAS DRIVEN GYROSCOPE SPEED CONTROL
Rudolph S. Petersen, Brookline, N.H., assignor to Sanders Associates, Inc., Nashua, N.H., a corporation of Delaware
Filed Aug. 19, 1966, Ser. No. 573,644
Int. Cl. G01c 19/12
U.S. Cl. 74—5.7                                     5 Claims

ABSTRACT OF THE DISCLOSURE

A device for controlling the flow of fluid in dependence upon the fluid temperature and more particularly, to a device of the aforesaid type for a use in a fluid driven gyroscope wherein the fluid flow regulation, which is dependent upon the fluid temperature is operative to control the speed of the gyroscope. The device comprises a body of selected material having a relatively high thermal coefficient of expansion which is thermally coupled to the fluid and which controls the amount of fluid flow.

This invention relates to gas driven gyroscopes and more particularly to a small, lightweight, economical gyroscope for use in, for example, a guided missile and which is expendable.

The gyroscopes in the guidance systems of short range missiles are necessarily reliable. However, the system must operate reliably and accurately only over a relatively short period of time. This permits many innovations which reduce the complexity and cost of the gyroscope, but do not substantially reduce the reliability and effectiveness of the gyroscope during the short operating interval. The present invention provides such a gyroscope with simple reliable means for controlling the speed of the gyroscope.

A gyroscope intended for use in a relatively short range missile should be capable of attaining sufficient speeds for providing gyroscopic action in a fraction of a second. In addition, the gyroscope must be stored in a ready condition for relatively long periods of time such as five years and the gyroscope rotor rotation must be initiated in an extremely short time, for example, as short as .01 second and thereafter, within .5 second, brought to the desired speed. After reaching the desired speed, the rotor speed must be maintained within a certain range for many minutes. Finally the gyroscope should be capable of repeated testing for checkout purposes prior to launching the missile.

Heretofore, gas driven gyroscopes which satisfy many of the above requirements have been employed. In one such gyroscope, the rotor and gyroscope gimbals are all contained within a pressurized container and means are provided for venting the container so that the gas therein rushes out along a path such that it delivers a reactive torque to the gyroscope rotor causing the rotor to spin. The rotor reaches a predetermined speed in a fraction of a second, whereupon a caging mechanism releases the gyroscope gimbals and so the gyroscope provides useful signals by which the guidance system controls the missile. Gyroscopes of this type are described in U.S. Pat. 3,102,430 which issued Sept. 3, 1963, to H. W. Boothroyd et al. and in U.S. Pat. 3,162,053 which issued Dec. 22, 1964, to D. Blitz.

In the first of the above patents, 3,102,430, the rotor is equipped with fins or vanes against which the gas impinges and, thereby, imparts rotational torque to the rotor. In the second, the rotor is equipped with jet nozzles from which gas within the rotor discharges and, thereby, imparts rotational torque to the rotor causing it to spin. Heretofore, various techniques have been employed to control the rotor speed in such gas driven gyroscopes. For example, the gas charge pressure is predetermined and the size of the nozzle from which the gas discharge is accurately designed to confine the final rotor speed within a narrow margin. In the later patent, 3,162,053, a mechanical structure is provided which responds to centrifugal force and controls the discharged rate of gas from the nozzles on the rotor. Both of these speed control techniques are subject to error which arises from changes in the temperature of the charging gas. In the first, if the gas temperature changes substantially, the pressure changes accordingly and so the discharge rate of gas from the gyroscope changes and this results in a different final speed of the rotor. In the second, a change in temperature alters the mechanical characteristics of the mechanical speed control and so the final speed which the rotor reaches is altered. Thus, the problems introduced by temperature changes are substantial. Within a typical missile during launch and flight, the temperature about the gyroscope may vary from as high as +165° F. to as low as —65° F. or colder.

It is, therefore, an object of the present invention to provide means for controlling a gas driven gyroscope so as to substantially compensate for changes in gyroscope speed caused by changes in temperature.

It is another object of the present invention to provide simple means having a minimum of mechanical parts for controlling the speed of a gas driven gyroscope.

It is another object to provide means for controlling the gas discharge rate from a gas driven gyroscope to compensate for changes in gyroscope speed caused by changes in the gas temperature.

It is another object of the present invention to provide a gas flow control system for a gas driven gyroscope by which changes in the gyroscope speed caused by changes in gas temperature are avoided.

In accordance with features of the present invention, a gas driven gyroscope is equipped with a temperature sensitive valve comprising a member fixed at one end and free at the other and which expands and contracts as its temperature changes so as to meter gas flow through an orifice. In various embodiments of the present invention, this temperature sensitive valve is employed to control the flow of gas which bypasses the rotor so that the bypass gas does not produce a torque for turning the rotor. In other embodiments, the temperature sensitive valve is employed to control the flow of gas which does produce a torque for turning the rotor. In either case, the gaseous charge available to bring the rotor to final speed is under control. In the first case, the amount of the energy available to turn the rotor is controlled and in the second case, the applied power to the rotor is controlled thereby controlling the rotor speed.

The temperature sensitive valve comprises an elongated member secured at one end and free at the other, made of a selected material and having selected dimensions and modulus of elasticity so that the free end moves in translation a substantial amount when the temperature of the member changes from —65° F. to +165° F and in a substantially uniform manner over this temperature range. In some of the embodiments described herein, the temperature sensitive valve opens at the lower temperature extreme and closes at the upper and in other embodiments it opens at the upper and closes at the lower temperature extreme. The particular operation selected depends upon how the valve is used.

Other features and objects of the present invention will be apparent from the following specific description taken in conjunction with the figures in which.

Figure 5:
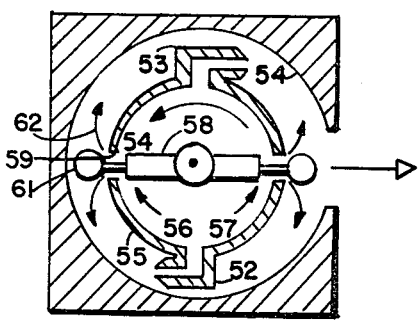
Figure 6:
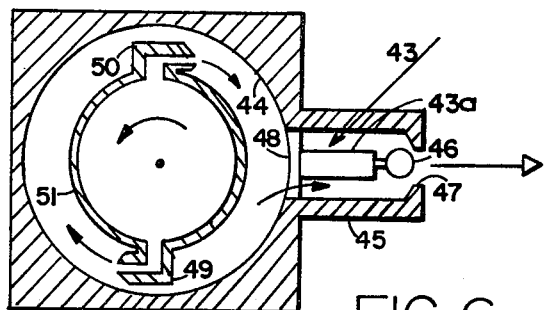

FIG. 5 llustrates the nozzle equipped gyroscope rotor with gas bypass control;

FIG. 6 illustrates the nozzle equipped gyroscope rotor with the temperature sensitive valve mounted in the gyroscope housing for direct control of the nozzle gas flow;

FIG. 7 illustrates in some detail a gas driven glyroscope having a vane type rotor and with the temperature sensitive valve positioned to conrtol the bypass flow of gas from the gyroscope housing;

FIGS. 8 and 9 illustrate the same type of gyroscope with the temperature sensitive valve for controlling all flow of gas from the housing;

FIG. 10 illustrates the nozzle type gas diven gyroscope rotor with the temperature sensitive valve controlling all flow of gas from the gyroscope housing; and FIG. 11 is a plot of rotor speed vs gas temperature to illustrate the stabilizing effect on final gyroscope rotor as a function of gas temperature obtained employing the invention in a typical one of the embodiments.

Figure 1:
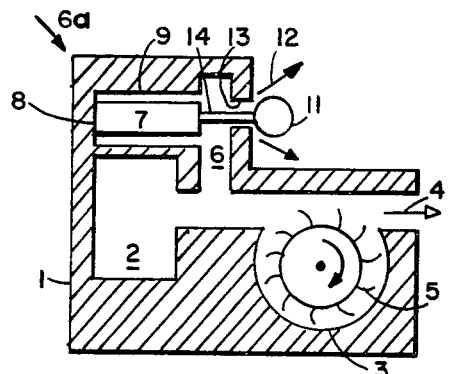
FIG. 1 is a sectional view illustrating a gas bypass system for temperature compensation in a gas driven vane type rotor gyroscope.
Figure 2:
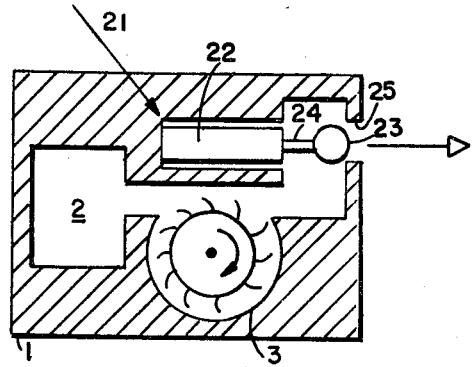
FIGS. 2 and 3 show the temperature compensation directly applied to the gas flow which drives the vane type gyroscope rotor.
Figure 3:
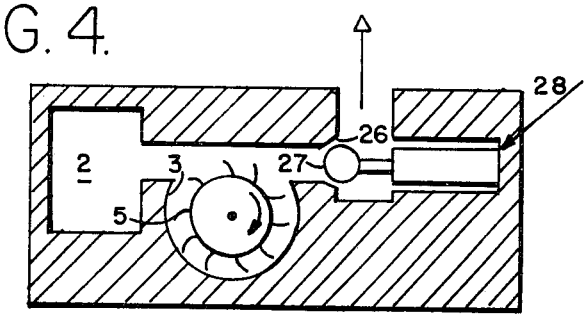

FIGS. 1 to 3 are sectional views of representative structures of embodiments of the invention for controlling the speed of rotation of a vane type gyroscope rotor. In each of these embodiments, a temperature sensitive valve controls the flow of gas from the chamber to compensate for the changes in temperatures of the charge of gas in the chamber and, thereby, compensate for the change in final rotor speed due to the change in a gas temperature. In each of these embodiments, a fixed charge of gas is employed to drive the gyroscope rotor to a predetermined speed. The system is so designed that the gas, charged to a predetermined pressure at a predetermined temperature, when exhausted to ambient surroundings will accelerate the gyroscope rotor to the desired speed. The temperature sensitive valve in each case serves to control the flow of gas so that even though the gas temperature changes, the final speed of the rotor remains substantially unchanged.

In FIG. 1, the gas driven gyroscope 1 includes a chamber 2 which is charged with a gas to a given pressure at a given temperature and a vane type gyroscope rotor 3 mounted for rotation so that the drive gas, flowing out path 4, impinges upon the vanes 5 and accelerates the rotor to the desired final speed. Quite obviously, if a given charge of gas at a given temperature and pressure is expelled from the chamber along the path 4 into a given ambient pressure, the rotor 3 will be accelerated to the desired speed, and if the temperature of the gas is increased, the pressure will increase because the volume is constant, and so the speed will be increased. In order to maintain the final speed constant regardless of increase in the temperature and/or pressure of gas in the chamber 2, a bleed or bypass system is provided in FIG. 1. The The bleed system consists of a passage 6 which drains off some of the gas from the chamber and expels it through the temperature sensitive valve 6a to the ambient surroundings. The temperature sensitive valve here includes, for example, a nylon rod 7 of predetermined dimensions mounted at one end 8 within a cavity 9. The cavity 9 connects to the chamber 2 via passage 6 and so the nylon rod is surrounded by gas from the chamber 2 and is at the same temperature as the gas in the chamber.

The other end of the nylon rod 7 carries a ball 11 which is disposed to block the bleed gas flow 12 from an orifice 13 which connects to the passage 6. The ball 11 is mounted on a neck 14 at the end of the nylon rod 7 and the neck extends from the end of the nylon rod 7 through the orifice 13 to the ball 11 disposed on the outside or ambient side of the orifice.

The dimensions of the nylon rod 7, neck 14, ball 11 and orifice 13 are preferably such that when the gas temperature is at its low extreme (−65° F.) substantially all the gas from the chamber goes out path 4 and drives the rotor 3. As the gas temperature increases, the nylon rod expands and the ball 11 moves away from the orifice so that it os no longer blocked. The further the ball moves from the orifice the less the orifice is blocked. Thus, as the temperature of the gas increases, a greater and greater portion of the gas flows out of the device as bleed gas 12 and less flows out as drive gas along path 4.

In a preferred embodiment of the present invention, the coefficient of thermal expansion of the nylon rod, the dimensions of the rod, neck and ball and the dimensions of the orifice are preferably such that the amount of gas which is bled off from the chamber and does not drive the rotor 3, exactly compensates for the increase in driving energy of the charge of gas due to an increase in the temperature of the gas. Thus, when the bleed operates, it bleeds off just enough of the gas from the chamber so that the final speed of the rotor 3 is the desired speed and this speed is substantially the same over the preferred operating range of the gyroscope which may be as great as from −65° F. to +165° F.

FIGS. 2 and 3 are also sectional views showing use of the invention in driving a vane type gyroscope rotor. In these embodiments, the drive gas flow rate is directly controlled by the temperature sensitive valve in such a manner that the rate of the drive gas cannot exceed a given predetermined rate which corresponds to the desired final speed of the gyroscope rotor. In FIG. 2, the temperature sensitive valve 21 includes a nylon rod 22 having a ball 23 attached at one end via a neck 24 all disposed on one side of the drive gas orifice 25. When gas from the chamber 2 is released, all of the gas in the chamber flows against the vanes 5 of the rotor 3 and is metered through the orifice 25 depending upon the position of the ball. The ball position depends upon the temperature of the gas. As the temperature of the gas increases, the ball moves into the orifice blocking the flow of drive gas through it and as the temperature decreases, the ball moves away from the orifice allowing an increase in the drive gas flow rate through the orifice.

In FIG. 3, the action is substantially the same as in FIG. 2; however, the dynamic force of the gas opposes movement of the ball 27 into the orifice 26. In FIG. 2, the dynamic force of the gas has a tendency to move the ball 23 into the orifice 25. The general effect, however, is the same; as the temperature of the gas increases, the orifice is gradually closed and as the temperature decreases, the orifice is opened. The embodiment in FIG. 2 might be preferred where in the event the temperature sensitive valve 21 fails, it would be desirable to stop all drive gas flow. On the other hand in FIG. 3, a failure of the temperature sensitive valve 28 would cause gas flow rate to increase to a maximum.

Figure 4:
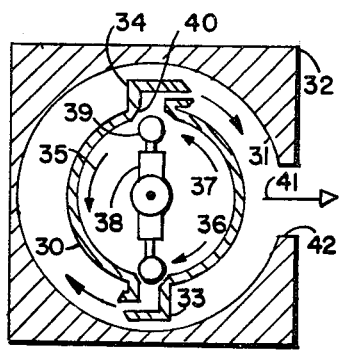
FIG. 4 illustrates the nozzle equipped gyroscope rotor with the temperature sensitive valve for controlling speed by direct control of gas flow from the nozzles.

FIGS. 4, 5 and 6 illustrate novel uses of the temperature sensitive valve in a gas driven gyroscope where the rotor is driven by jets of gas expelled from nozzles attached to the rotor. In this type of gas driven gyroscope, the gyroscope housing is charged with gas at a given temperature and pressure and as a result, the inside of the spherical rotor is charged with the gas. Thereafter, when the housing is vented to ambient pressure, the gas within the rotor discharges through the nozzles and drives the rotor in rotation. Any number of such nozzles can be employed, however, for purposes of balance an even number of nozzles is preferred. The embodiments in FIGS. 4 and 6 illustrate means for directly controlling the flow of drive gas which issues from the nozzle to control the rotational speed of the rotor. In FIG. 5, some of the gas within the rotor is bled off through suitable openings so that the bleed gas does not substantially contribute to rotational torque on the rotor. Thus, the embodiments in FIGS. 4 and 6 are similar to those in FIGS. 2 and 3, insofar as the rate at which the gas does work on the rotor is controlled and the embodiment in FIG. 5 is similar to that in FIG. 1, insofar as the total amount of gas made available for doing work on the rotor is controlled. In either case, the control preferably compensates for changes in temperature of the gas so that the final speed of the rotor when the gas is discharged from the chamber to ambient pressure is substantially independent of the gas temperature, assuming all other parameters to be constant.

In FIG. 4, the rotor 30 is suspended for rotation in the gas charge chamber 31 formed within the housing 32. When the chamber is charged with gas at a given temperature and pressure, the charge gas fills the inside of the rotor. Thereafter, when the chamber 31 is vented to the ambient pressure, the gas in the rotor discharged from the nozzles 33 and 34 exerting a torque upon the rotor causing it to rotate in the direction of the arrow 35. Mounted within the rotor are two temperaure sensitive valves 36 and 37, one for each of nozzles 33 and 34, respectively. These valves are fixed to the rotor and so they rotate with it and each includes a nylon rod and ball so dimensioned and situated that the ball blocks or opens flow to the associated nozzle as the nylon rod expands or contracts in compliance with the temperature of the gas. For example, when the gas temperature increases, the nylon rod 38 expands moving the ball 39 into the orifice 40 which feeds the nozzle 34 and so the flow rate through the nozzle is controlled by the temperature sensitive valve 37. The drive gas flow, represented by arrow 41, issued into the ambient surroundings via a large opening 42 created in the housing 32 to initiate operation.

The embodiment in FIG. 6 is similar in principle to the one in FIG. 4; however, here, the temperature sensitive valve 43 controls the flow from the chamber 44 into the ambient surroundings. In operation, the chamber 44 is charged with gas at a predetermined pressure and temperature and thereafter the chamber is suddenly vented through a conduit 45 in which is disposed the temperature sensitive valve 43. The valve includes a nylon rod 43a with a ball 46 mounted at one end and positioned to block discharge orifice 47 which vents the chamber. The other end of the nylon rod is secured to the chamber by mount 48 so that the drive gas which issues from the nozzles 49 and 50 on the rotor 51 within the chamber, flows around the nylon rod, which assumes the temperature of the gas and expands or contracts as necessary to block or open the orifice 47 and control the flow rate of drive gas for reasons already described.

In FIG. 5, the flow rate from the nozzles 52 and 53 is not controlled and accordingly, varies depending upon the pressure of the gas in the chamber 54. Here, a certain amount of the gas within the rotor 55 is bled out of the rotor and discharged without producing any substantial torque on the rotor such as produced by flow from the nozzles. For this purpose, two temperature sensitive valves 56 and 57 are provided and are mounted to the rotor. These valves, such as 56, include a nylon rod 58 mounted at one end to the rotor and having a neck at the other end which extends through an orifice 59 in the rotor shell. A ball 61 attached to the end of the neck extending beyond the rotor moves toward or away from the orifice 59 as the rod expands or contracts in compliance with the temperature of the gas within the rotor. As the gas temperature increases, the ball moves away from the orifice and so a greater amount of bleed gas 62 flows from inside the rotor and is expelled from the rotor without producing any substantial rotational torque on the rotor. Thus, during the period the rotor is driven in rotation by gas issuing from the orifices 52 and 53, a certain quantity of the gas is bled off from the rotor and produces no torque and this quantity of gas that is bled off, preferably compensates for the increase in rotational work that can be applied to the rotor due to a change in the gas temperature.

FIGS. 7, 8 and 9 illustrate sectional views of charge gas driven gyroscopes incorporating the features described above with reference to FIGS. 1, 2 and 3, respectively. Each of the structures in FIGS. 7 to 9 include a gyroscope housing 63 including a charge chamber 64 in which the vane type gyroscope rotor 65 is mounted on a pair of gimbals. The rotor 65 is mounted on an axle 66 carried by the inner spherical gimbal 67 which is preferably a closed sphere completely enclosing the rotor 65. This inner gimbal 67 is supported for rotation on an axis 68 by way of bearings 69 and 70 supported by the outer gimbal 71. The outer gimbal 71 is in turn supported for rotation about axis 72 on bearings 73 and 74 which are carried inside the cavity 64. Thus, the gimbals can precess about the axes 68 and 72 and means can be coupled to the axes for extracting signals to represent the precession angle or rate depending upon the use of the gyroscope which is intended.

Generally, in operation, the chamber 64 is charged through a check valve 75 from a suitable source of pressure outside the gyroscope. The charge gas flows throughout the chamber filling all spaces therein. It flows through the multitude of drive orifices 76 in the spherical inner gimbal and, thus, it fills the space 77 surrounding the rotor 65 and the spaces between the gimbals and outside the gimbals with gas at a predetermined pressure and temperature. The chamber is filled in this manner while the gyroscope gimbals are caged. The caging mechanism 78 is operated by a bellows 79 within the chamber 64 which positions the caging mechanism so that the gimbals are caged when the chamber is charged with gas. The caging mechanism is constructed so that it not only locks the gimbals 67 and 71 in fixed positions as soon as the chamber 64 is charged with gas, but also provides a conduit 80 for conducting gas from within the spherical gimbal 67 to the ambient surroundings. Thus, the caging mechanism provides an exhaust for the gas in the chamber such that the chamber gas must flow from around the two gimbals through the orifices 76 into the space 77 inside the inner gimbal for impingement upon the vanes 81, and from there to the exhaust and in this manner drives the rotor 65 in rotation in the direction of arrow 82.

The details of construction of a suitable caging mechanism 78 which performs as described above are described in considerable detail in the above mentioned Patent 3,102,430 wich issued Sept. 3, 1963 to H. W. Boothroyd et al.

In FIG. 7, the charge gas from the chamber 64 is discharged via two paths, one through the caging mechanism 78 and the other through a bleed conduit 83 which is metered by the temperature sensitive valve 84. The valve 84 functions similar to the valve 6 in FIG. 1 insofar as it includes a nylon rod 85 secured at one end to a threaded plug 86 screwed to the housing and free at the other from which a neck 87 extends through a control orifice 88 and carries the ball 89 on the other side of the orifice. Thus, a fraction of the gas in the chamber 64 is bled off from the chamber so that it does not flow against the vanes 81 on the rotor and does not contribute to the rotational acceleration of the rotor. In this case, an increase in the temperature of the gas causes the rod to expand and open the orifice 88 so that the amount of gas bled from the chamber 64 is increased as gas temperature increases. Similarly, when gas temperature decreases, the amount of gas bled from the chamber is decreased. Thus, the final speed of the rotor 65 in this embodiment is controlled by employing less than all of the gas charge in the chamber to drive the rotor when the energy of the gas becomes greater than a predetermined level. The valve 84 is preferably designed so that the bleed gas flow rate is substantially zero at the low extreme temperature of operation and is substantially greater than zero at the high extreme temperature of operation.

In operation, the chamber 64 is charged via the check valve 75 to a suitable pressure. Immediately, the bellows 79 is compressed and the caging mechanism 78 engages the gimbals holding them in caged positions and providing a conduit from the inside of the inner spherical gimbal 67 through opening 91 and conduit 80 to the release mechanism 92. Thereafter release mechanism 92 is energized opening the conduit 80 to ambient pressure. This permits gas to flow from the chamber 64 through the orifices 76 in the spherical gimbal and impinge upon the vanes 81 driving the rotor in rotation in the direction of the arrow 82. Bleed gas from the chamber is metered by the temperature sensitive control valve 84, as already described, to compensate for the effects of increased gas temperature on the final speed of the rotor.

In FIG. 8, the chamber 64 is exhausted via a temperature sensitive valve 93 so that the exhaust gas which is the drive gas is metered by the valve. The valve includes a chamber 95 connected to the exhaust from the caging mechanism 78. This chamber contains a nylon rod 96 mounted at one end at an adjustable plug 97 threadably connected to the chamber so that by screwing the plug in or out, the translational position of the nylon rod may be adjusted with reference to the orifice 98 which controls the flow of exhaust drive gas issuing from the gyroscope housing. The other end of the nylon rod carries a ball 99 connected thereto by a neck and which is positioned in or out of the orifice as necessary in response to the gas temperature to maintain the flow rate of gas through the orifice at a prescribed level.

In operation, when the rod expands with an increase in temperature, the ball blocks the orifice 98 and when the rod contracts, the ball opens the orifice and so the gas flow through the drive orifices 76 in the inner spherical gimbal which impinges upon the vanes on the rotor, decreases as the gas temperature increases and increases as the gas temperature decreases. This increase or decrease is preferably just sufficient to compensate for changes in the power of the flow of gas attributed solely to changes in the gas temperature. In this manner, the temperature sensitive valve 93 operates to compensate for changes in the ultimate speed of the rotor due to changes in the temperature of the gas which charges the cavity 64.

In FIG. 9, operation is substantially the same as in FIG. 8 except that the temperature sensitive valve 100 closes in opposition to the gas flow dynamic force. Accordingly, if the valve ball 101 should break off, it would not block gas flow and the gyroscope would still operate.

Turning next to FIG. 10 there is illustrated in sectional view in some detail, a structure functioning substantially as described above with reference to FIG. 6. FIG. 10 illustrates a one shot gas driven gyroscope of the type similar to that described in considerable detail in the above mentioned U.S. Pat. 3,162,053 which issued Dec. 22, 1964 to D. Blitz. Here, the gyroscope rotor is preferably a closed sphere 102 or cylinder with two nozzles 103 and 104 from which gas within the cylinder discharges producing a reactive thrust exerting a torque on the rotor causing it to rotate about an axle 105 carried by the inner gimbal ring 106. The direction of rotation is indicated by arrow 107. The gimbal ring 106 is pivotally supported for rotation about axis 108 on bearings 109 and 110 supported by the outer gimbal ring 111. The outer ring is pivotally supported on axis 112 by bearings 113 and 114 carried inside the chamber 115 in the housing 116.

The gyroscope chamber 115 is charged with gas at suitable temperature and pressure through check valve 117 at which time the caging mechanism 118 immediately engages the inner and outer gimbals 106 and 111 locking them in position. In this condition, the structure may be stored a substantial length of time and then actuated by the release mechanism 119 which may be mechanically or electrically controlled to open the exhaust passage from the chamber 115 to the ambient surroundings. This exhaust passage includes the temperature sensitive valve 120 comprising a nylon rod 121 having one end fixed to a threaded plug 122 screwed into the housing and carrying at the other end, a ball 123 which is moved into or out of the orifice 124 controlling exhaust flow from the chamber 115. As the temperature of the gas from the chamber is increased or becomes greater, the nylon rod 121 expands and the ball partially blocks flow through the orifice. On the other hand, when the temperature of the gas decreases, the rod 121 contracts and opens the orifice. Thus, the flow rate of gas from the chamber 115 into the ambient surroundings is varied inversely with the temperature of the gas and this flow rate in turn determines the impulse produced at the nozzles 103 and 104 which exert a rotational torque upon the rotor driving the rotor in rotation.

In this embodiment, the decrease in impulse caused by a decrease in exhaust flow rate due to the action of the temperature sensitive valve 120, exactly balances an increase in the impulse caused by rise in the temperature of the gas in the chamber 115, and so the valve 120 functions to compensate for the effects of changes in temperature on the ultimate speed of the rotor of the gyroscope.

The caging mechanism 118 in this embodiment as well as the caging mechanism 78 in FIGS. 7 to 9 serves to hold the gimbals of the gyroscope fixed in position until rotor is brought up to speed. The details of a suitable mechanism for accomplishing the purposes of the caging mechanism 118 are described in considerable detail in the above mentioned Pat. No. 3,162,053. The caging mechanism described in this patent generally responds to pressure. More particularly, it cages the gimbals when the chamber 115 is charged and uncages them thereafter when the chamber is discharged and the rotor has accelerated to speed. The caging mechanism 78 shown in FIGS. 7 to 9 and described in the Pat. 3,102,430 also responds to pressure. It cages the gimbals when the chamber is charged and uncages the gimbals thereafter when the chamber is discharged. In addition, this latter caging mechanism provides the gas conduit path from inside the inner gimbal to the exhaust.

The details of design of the temperature sensitive valve employed as illustrated in FIG. 1 require careful consideration if the rotor speed is to remain substantially constant over the gas temperature range from $-65°$ F. to $+165°$ F. For example, if the chamber 2 is charged with gas at 1,000 p.s.i. and $-65°$ F. and the diameter of the orifice 13 through which the bleed gas 12 flows and the diameter of the drive gas path 4 are both .001 inch, it is suitable to employ a nylon rod 7 and neck 14 which is 2.00 inches long, and the rod is .085 inch in diameter and made of Zytel nylon resin a product of E. I. du Pont de Nemours & Co. and denoted Zytel 101. In addition, the ball is preferably .125 inch in diameter and the neck attaching the ball to the rod and extending through the orifice 13 is preferably .060 inch in diameter. The ball and rod are positioned so that when the rod and gas are at the lowest temperature extreme ($-65°$ F.) the ball just blocks all flow from the orifice 13.

Employing a temperature sensitive valve of the above dimensions as described with reference to FIG. 1, a substantial improvement has been obtained in the uniformity of final rotor speed over a range of gas temperatures. FIG. 11 illustrates this improvement. In FIG. 11, the curve 125, relating speed and temperature, illustrates operation of a gas driven gyroscope without temperature compensation of the type described in the present invention. As can be seen, the final speed of rotation of the rotor varies considerably over the range of operating temperatures. The straight, substantially constant speed curve 126 illustrates the improvement achieved employing the temperature sensitive valve as described herein. As can be seen, the speed remains substantially constant over the operating temperature range of the gyroscope.

This completes descriptions of various embodiments of the present invention of a gas driven gyroscope equipped with speed control which compensates for changes in ultimate gyroscope speed as a result of variation in the temperature of the gas charge in the gyroscope. The various embodiments described herein are made by way of example and are not intended to limit the spirit and scope of the invention as set forth in the accompanying claims.

What is claimed is:

1. In a fluid driven gyroscope of the type in which the gyroscope rotor is disposed within a chamber which is charged with a fluid at pressure so that upon releasing said fluid charge from said chamber said rotor is driven in rotation by the flow of said fluid.
   A. means for controlling said rotation speed comprising,
      (1) a temperature sensitive valve for altering the flow of said fluid in compensation for changes in said flow due to changes in the temperature of said fluid.

2. Speed control means as in claim 1 and in which, said temperature sensitive valve directly controls the flow rate of said flowing fluid which drives said rotor in rotation.

3. Speed control means as in claim 1 and in which, only a portion of said fluid flowing from said chamber so as to drive said rotor in rotation and said temperature sensitive valve controls the flow rate of the rest of said fluid.

4. Speed control means as in claim 2 and in which, said temperature sensitive means includes,
   (A) an elongated body of selected material fixed at one end relative to said flowing fluid which drives said rotor in rotation and thermally coupled with said fluid,
   (B) means at the other end of said body for blocking said flow which drives said rotor more or less depending upon the length of said body,
   (C) said body material being selected with a coefficient of thermal expansion so that said flow is blocked more or less depending upon the temperature of said fluid.

5. Speed control means as in claim 3 and in which, said temperature sensitive means includes,
   (A) an elongated body of selected material fixed at one end relative to said flowing fluid which does not drive said rotor in rotation and thermally coupled with said fluid.
   (B) means at the other end of said body for blocking said flow which does not drive said rotor more or less depending upon the length of said body.
   (C) said body material being selected with a coefficient of thermal expansion so that said flow is blocked more or less depending upon the temperature of said fluid.

References Cited
UNITED STATES PATENTS

| | | | |
|---|---|---|---|
| 2,610,300 | 9/1952 | Walton et al. | 137—468 |
| 2,859,768 | 11/1958 | Teague | 137—468 |
| 3,055,635 | 9/1962 | Samet | 74—5.7 XR |
| 3,082,787 | 3/1963 | Elston et al. | 137—468 |
| 3,186,241 | 6/1965 | Blanding et al. | 74—5.7 |
| 3,192,777 | 7/1965 | Zatsky et al. | 74—5.7 |
| 3,242,743 | 3/1966 | Samet | 74—5.7 |
| 3,257,854 | 6/1966 | Schneider et al. | 74—5.7 |
| 1,877,764 | 9/1932 | James | 165—40 |
| 2,996,330 | 4/1935 | Goshaw | 236—93 XR |
| 2,434,393 | 1/1948 | Chace et al. | 236—93 XR |

FRED C. MATTERN, Jr., Primary Examiner

M. A. ANTONAKAS, Assistant Examiner

U.S. Cl. X.R.

74—5.43

PO-1050
(5/69)

UNITED STATES PATENT OFFICE
CERTIFICATE OF CORRECTION

Patent No. 3,511,101　　　　　　　　　　Dated　　May 12, 1970

Inventor(s)　　Rudolph S. Petersen

It is certified that error appears in the above-identified patent and that said Letters Patent are hereby corrected as shown below:

Column 1 line 15 cancel "a" (second occurrence). Column 2 line 48 before "gaseous" insert --total--. Column 3 lines 11 and 12 correct the spelling of "gyroscope"; line 13 correct the spelling of "control"; line 18 correct the spelling of "driven"; line 22 after "rotor" insert --speed--; line 29 cancel "the" and substitute --a--. Column 4 line 6 cancel "os" and substitute --is--; line 28 after "rate" insert --of flow--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents